3,398,859
MEASURING PUMP
Carl H. Mueller, Pasadena Hills, Mo., assignor to McNeil Corporation, Akron, Ohio, a corporation of Ohio
Filed May 2, 1966, Ser. No. 546,737
11 Claims. (Cl. 222—41)

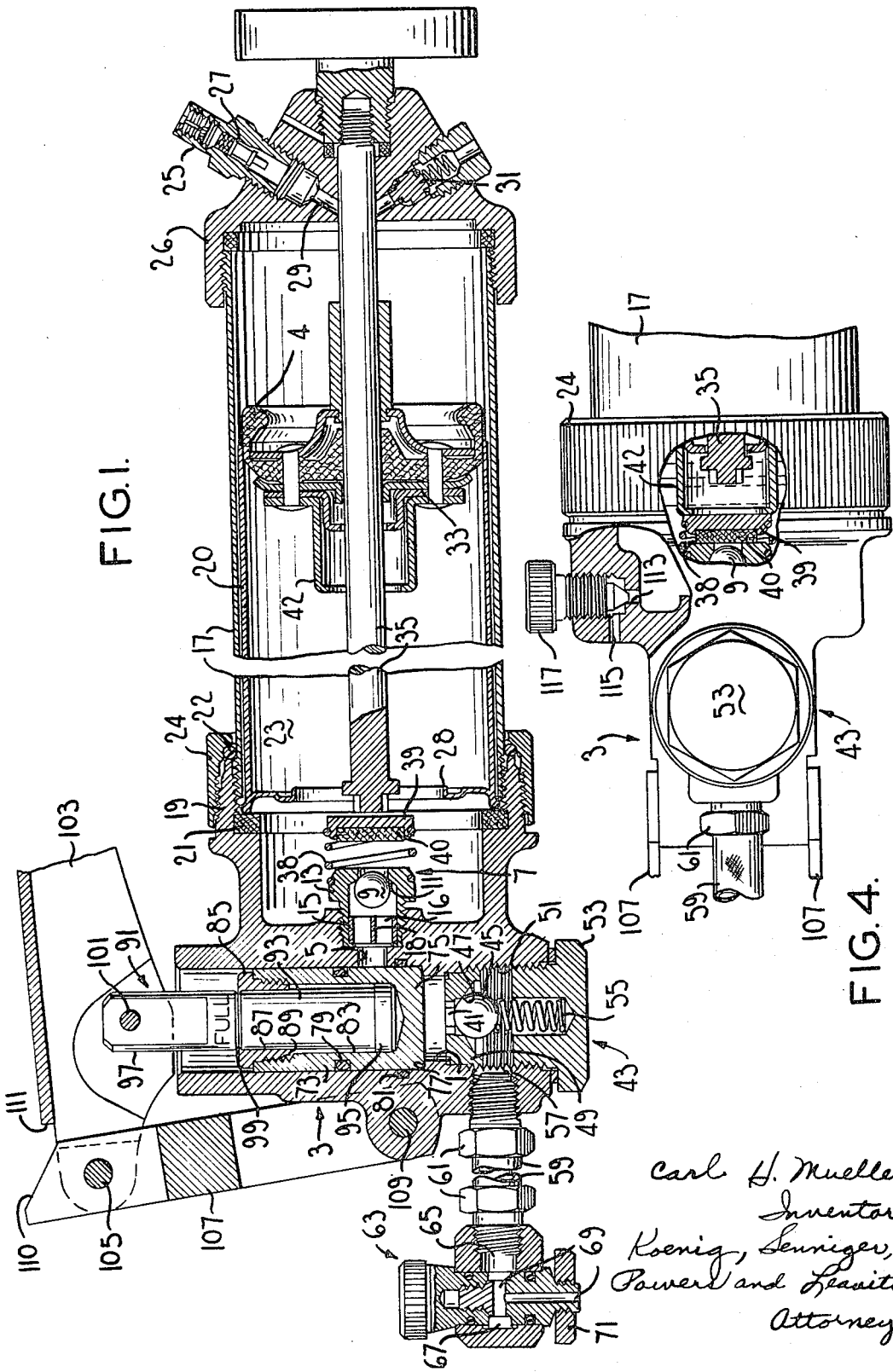

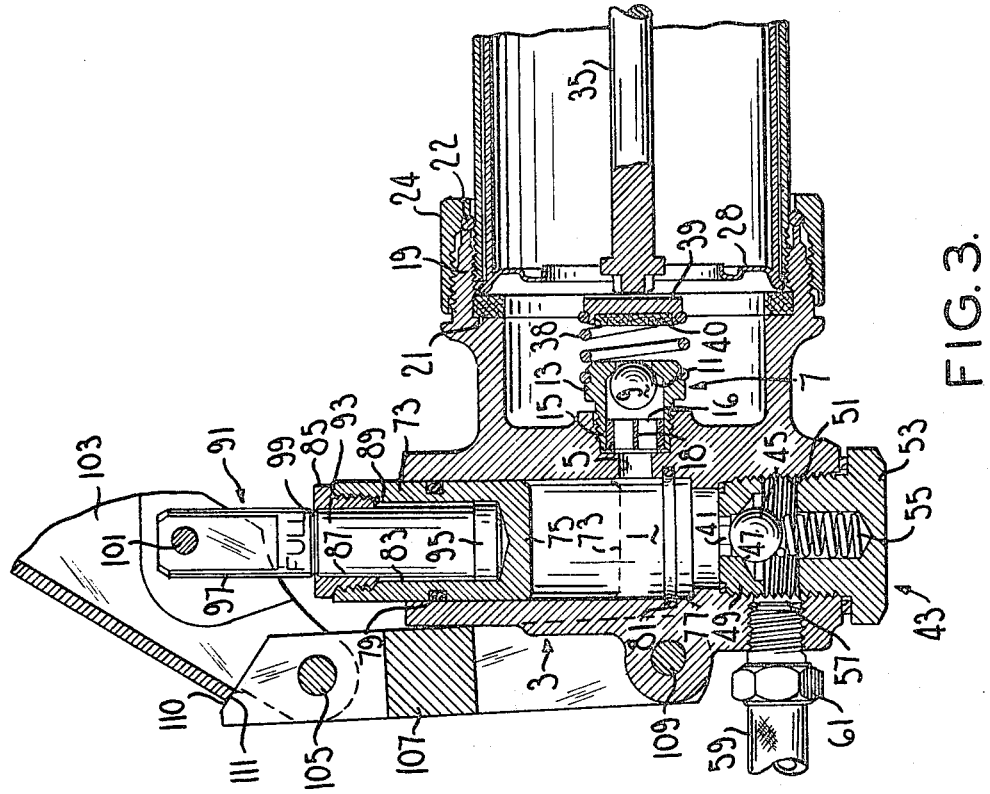
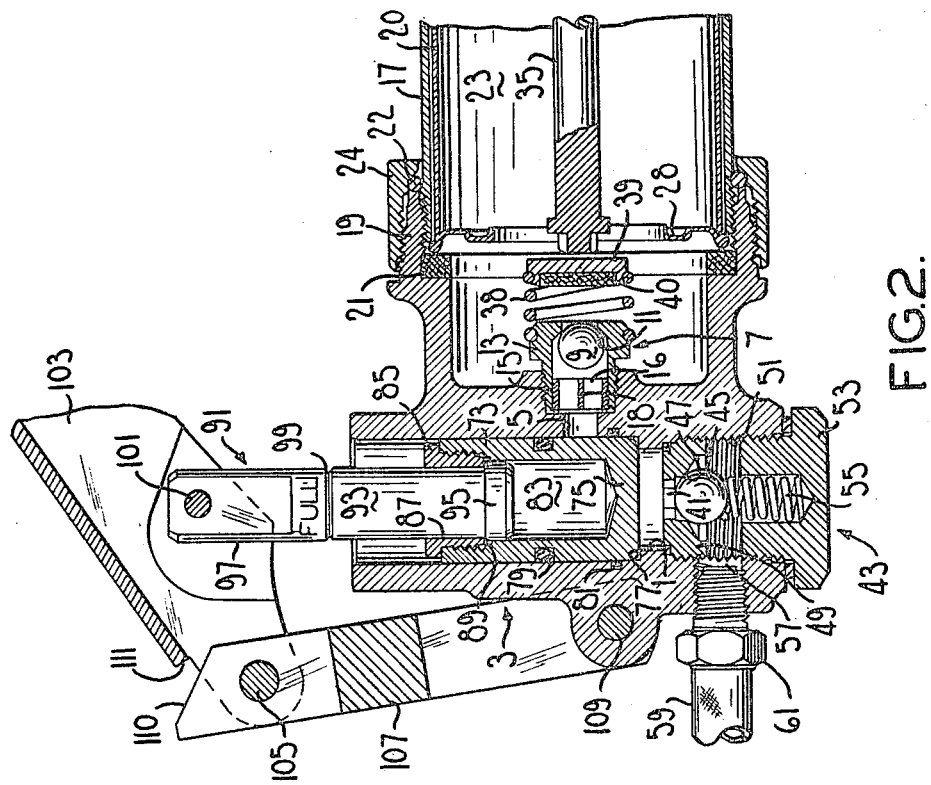

ABSTRACT OF THE DISCLOSURE

A pump for delivering measured amounts of lubricant under pressure comprises a pump cylinder having inlet and outlet passages each passage having a reverse check valve therein. Inlet closure means is also provided for the inlet check valve. A lubricant supply cylinder contains a follower piston biased to force lubricant toward the inlet. The follower piston carries means to operate the inlet closure means when lubricant is substantially exhausted.

In the pump cylinder is a pump piston which upon a pressure stroke covers the inlet. Upon a partial return stroke the pump piston uncovers said inlet. In the pump piston is a lost-motion plunger for driving the pump piston across the inlet and delivering lubricant through the outlet. Upon retractive lost motion between the plunger and the pump piston the latter is retracted sufficiently to open the inlet. This permits entry of lubricant under pressure from the follower piston. The entering lubricant pushes back the pump piston to take up said lost motion and fills the pump cylinder. The plunger carries an index which when reached by an indicator part on the pump piston shows that the pump cylinder is full. If not reached, the indication is that the cylinder is short of being full. An oscillating linkage drives the plunger between fixed advanced and retracted limits. The retracted limit determines where said index is located on the plunger.

Between the pump cylinder and the lubricant supply cylinder is a manually operable bleeder valve for eliminating any entrapped air after the supply cylinder has been loaded with lubricant and attached, before pumping starts. From the pump outlet extends a lubricant line at the end of which is a swiveling connector nozzle.

Among the several objects of the invention may be noted the provision of a pump designed to deliver an accurately measured volume of liquid to a confined space without damage to the confining means; the provision of a pump of the class described which indicates if and when it fails to deliver an accurately measured charge; the provision of such a pump which is manually operable and in which the indicating means is made obvious to the operator of the pump; the provision of a liquid pump of the class described wherein gas can be bled from the pump; the provision of a liquid pump wherein the inlet to the pump is closed when its liquid supply is substantially exhausted; and the provision of a pump of this class which is simple in construction and foolproof in operation. Other objects and features will be in part apparent and in part pointed out hereinafter.

The invention accordingly comprises the construction hereinafter described, the scope of the invention being indicated in the following claims.

In the accompanying drawings, in which one of various possible embodiments of the invention is illustrated, FIG. 1 is a cross section through a pump of this invention showing the position of the parts at the end of a lubricant-discharging stroke;

FIG. 2 is a cross section similar to FIG. 1 showing the position of the pump parts at an intermediate stage of a recharging stroke;

FIG. 3 is a cross section showing the pump parts at the end of the recharging stroke with the pumping chamber completely filled with lubricant; and FIG. 4 is a fragmentary view of the bottom of the pump, certain parts being broken away and shown in cross section in an alternative position.

Corresponding reference characters indicate corresponding parts throughout the several views of the drawings. For clarity the lubricant or liquid which the device pumps is not shown but it will be understood that the device when in operation is properly infilled.

Referring now to the drawings in detail, a measuring pump of this invention comprises a cylinder 1 in a pump body 3. There is a lateral inlet port 5 near the lower end of the cylinder. A check valve 7 controls flow of lubricant into port 5. Valve 7 comprises a ball 9 engageable with an annular seat 11 in a valve body 13 threaded into the pump body 3 around the inlet port 5. The ball is moved away from its seat by the pressure of fluid from the right and by suction in cylinder 1. Ball 9 is forced against its seat 11 by fluid pressure from cylinder 1 during a discharging stroke of the pump. A ball retainer or stop 15 in valve body 13 comprises a ring-shaped member 16 positioned around port 5 and a crosspiece 18 which extends across port 5 to limit movement of ball 9 toward the port without blocking flow of lubricant around the ball into the port through member 16.

A cylindrical barrel 17 threaded into fitting 19 on body 3 has an inner end which engages a seal 21 to seal the barrel to the pump body. A cartridge 20 may be provided in barrel 17. The beaded left end of cartridge 20 is urged against seal 21 by the threaded end of barrel 17. The left end of the cartridge 20 has a central opening 28. An O-ring seal 22 and retainer 24 on fitting 19 prevent loss of lubricant or gas between the fitting and the barrel. A lubricant may be provided in space 23 in cartridge 20 or, in the absence of the cartridge, in barrel 17. The lubricant can be forced past ball check 9, through inlet port 5 and into cylinder 1. The means shown in the drawings for forcing lubricant in space 23 past the ball check 9 comprises an air inlet fitting 25 (FIG. 1) in a head 26 mounted on the outer end of the barrel. A check valve 27 in fitting 25 may be opened by air under pressure. This air passes through the check valve 27 and through a passage 29 into the barrel 17 to the right of the follower piston 33. A relief check valve 31 limits the maximum pressure of air carried in the barrel on the left side of piston 33 to about 70 p.s.i.

A piston 33 in the barrel slides along the inner wall of the barrel on a rod 35. The piston is under air pressure acting against the right side of the piston. A stop 37 at the left end of rod 35 limits movement of the piston to the left. When the barrel is substantially full of lubricant, the piston 33 is at the far right. When air under pressure is provided on the right side of piston 33, it is urged to the left toward check valve 7, thus forcing lubricant toward valve 7, which opens if the pressure in the cylinder 1 is less than that in the barrel 17. Valve 7 prevents lubricant within cylinder 1 from being forced back into the barrel during a discharge stroke of the pump when the pressure in cylinder 1 exceeds that in the barrel 17.

A spring 38 has one end convolution seated in a groove in the valve body 13. The other end convolution of the spring is seated in a groove in a check valve 39 having a disc-shaped resilient sealing member 40 on its left side facing the valve 7. Flange 42 on the left end of the piston engages the check valve 39 to compress spring 38 as the piston approaches its far left position. When the sealing member 40 is compressed against the right end face of the valve body 13 (FIG. 4) lubricant or other fluids can no longer flow from the space 23 through the valve into cylinder 1. This prevents drawing lubricant or air into the cylinder 1 after lubricant has been exhausted from the barrel and cartridge by movement of the follower piston 33 to the extreme left.

This check valve structure 39 also ensures that operation of piston 75 after the barrel 17 or cartridge 20 is empty will not draw a vacuum on the left side of the follower piston 33. This eventuality is undesirable because it would result in the possibility of air from between the cartridge 20 and the barrel 17 collapsing the left end of the cartridge and entering the space around the inlet check valve 7 and thence entering cylinder 1.

An outlet port 41 at the lower end of the cylinder is normally closed to the passage of lubricant by a check valve 43. Valve 43 comprises a ball 45 engageable with a seat 47 surrounding outlet port 41. Seat 47 is formed on an annular member 49 threaded into an opening 51 in the lower end of the pump body. A plug 53 in the lower end of opening 51 receives a spring 55 which reacts from the plug against ball 45 for biasing the ball against its seat to close the valve. Check valve 43 prevents flow of lubricant into the cylinder 1 through outlet port 41 during a recharging stroke of the pump. Spring 55 should be sufficiently strong to hold the ball 45 seated against the pressure exerted on the lubricant by piston 33 so that when port 5 is unblocked lubricant will not flow through the inlet port into cylinder 1 and then out through port 41 and check valve 43.

Immediately beneath the seat 47 there is a lateral outlet port 57. A flexible hose 59 is connected by fittings 61 to the port 57 and to a swiveling nozzle shown generally at 63. Nozzle 63 has an inlet passage 65 which communicates with an annular passage 67 in the nozzle and with hose 59 through fitting 61. Lubricant delivered to passage 67 enters a T-shaped passage 69 and is discharged from the lower end of the nozzle. The nozzle may be fixed to a housing 71 of a point of lubrication, such as the housing of a ball joint or bearing to be lubricated.

What may be called a floating piston 73 reciprocates through cylinder 1 between a first position (FIG. 1) where its lower closed end 75 engages a shoulder 77 at the lower end of cylinder 1 and a second fully retracted position (FIG. 3) where its lower end is positioned at the upper end of the cylinder. When the piston is fully in its first position it blocks inlet port 5. An O-ring seal 79 seated in a groove in the piston engages the walls of cylinder 1 above port 5 to prevent lubricant from passing upwardly from the chamber around the piston. Seal 79 does not travel across the port 5 where it would be subject to wear. When the piston is in its FIG. 1 position it engages an O-ring seal 81 seated in a groove in the lower end of cylinder 1 between the inlet and outlet ports. Thus when the piston is in its FIG. 1 position lubricant can pass neither upward nor downward around the piston from inlet port 5.

Piston 73 has a generally cylindrical bore 83 which extends from the closed end 75 to its upper end. Bore 83 is open at the top. A nipple 85 in the upper end of piston 73 has a bore 87 which has a slightly smaller inside diameter than the bore 83 of the piston, thereby forming an annular shoulder 89 near the upper end of bore 83.

A plunger 91 has a cylindrical lower end portion 93 which is slidable through the bore 87 of the nipple 85. An enlarged head 95 at the lower end of the plunger engages and travels along the bore 83 of the piston between a lowered position (FIG. 1) wherein the head engages a shoulder formed by the closed end 75 of the piston, and an elevated or raised position (FIG. 2) wherein the head engages the shoulder 89. When the plunger is raised above the FIG. 2 position it also partially raises the piston (FIG. 3 dotted line 73), and when the plunger is lowered from the FIG. 3 position it forces the piston downward into the cylinder for discharging lubricant from the cylinder. In between these two extreme positions of movement the plunger head 95 has a sliding, lost-motion connection with the piston, thereby permitting some independent movement of the plunger and piston.

The plunger has an upper end portion 97 which projects above the upper edge of the nipple 85. An annular marker groove 99 in the plunger is used in determining whether or not cylinder 1 is full of lubricant, as explained below.

The upper end of the plunger is pinned at 101 to an oscillating operating pump arm or handle, a portion of which is shown at 103. Pin 101 is connected to handle 103 a short distance from the end of the arm. The end of the arm is pivoted by a pin 105 to the bifurcated end of a rocker arm 107. The other end of the rocker arm is pivoted at 109 on the body 3. This linkage is connected so that movement of handle 103 advances or retracts the plunger on a line coaxial with cylinder 1. Retraction of the plunger relative to the cylinder is limited by engagement of the beveled end 110, rocker arm 107 and a part 111 on arm 103, as shown in FIG. 3. This linkage and stop arrangement limits the bending force that may be applied to the plunger by the operator of the pump. This also determines the position of the groove 99 when the handle 103 is up. Downward advance of the plunger is limited by engagement of head 95 with end 75 of the piston and by engagement of the piston with shoulder 77.

An air passage comprising branches 113 and 115 (FIG. 4) is provided for bleeding air or other gases to the atmosphere from the area around inlet check valve 7, thereby purging them from the pump without passing them through cylinder 1. Air may become trapped in this area when an emptied cartridge is replaced with a full cartridge. This bleed passage is normally closed by a plug 117 engageable with an annular seat at an end of branch 113.

Operation of the pump of the invention is as follows:

Assume initially that the parts of the pump are in the position shown in FIG. 1 of the drawings, i.e., at the end of a discharge stroke and at the beginning of a recharging stroke. Also assume that the right end of barrel 17 contains air under sufficient pressure to force piston 33 against the lubricant for delivering lubricant through check valve 7 and through inlet port 5 into chamber 1 when the inlet port is unblocked by upward movement of the floating piston. Assume also that the passages between the outlet port 41 and the lubricating point are primed with lubricant.

In order to charge cylinder 1, the right end of handle 103 is lifted to retract the plunger 91. As the plunger moves from its FIG. 1 to its FIG. 2 position, the head 95 travels with lost motion through the bore 83 of the piston from the lower end of the bore to the point where the head touches the shoulder 89. This movement of the plunger does not move the piston and no lubricant is or can be delivered into the cylinder.

Continued movement of the handle 103 from the FIG. 2 to the FIG. 3 limiting position fully retracts the plunger (its FIG. 3 position). Plunger head 95 is in contact with shoulder 89 during this latter movement. As a result, it lifts the piston to the dotted-line position in FIG. 3 in which the inlet port is unblocked. Since the cylinder 1 is free of lubricant and because of the pressure exerted by the lubricant in the barrel 17, check valve 7 is opened and lubricant flows from the cartridge through the check valve and the inlet port into cylinder 1. As the lubricant enters the cylinder it presses against the closed end 75 of the piston to move the piston upward on the plunger 91 until the head 95 and the closed end 75 of the piston are in contact. This is the FIG. 3 solid-line position. The piston does not reach this fully retracted position until cylinder 1 is completely filled with the lubricant. At this time the upper edge of the nipple 85 is in register with the groove 99 in the plunger which indicates that the cylinder 1 is completely charged.

By moving the right end of handle 103 downward from its FIG. 3 to its FIG. 1 position, the plunger and piston simultaneously sweep through the cylinder (without lost motion). As a result the piston forces lubricant out of the cylinder through the port 41 and the check valve 43. Since hose 59 and nozzle 63 are primed with lubricant, a quantity of lubricant equal to the volume of lubricant forced from cylinder 1 will be injected by nozzle 63 to the point of lubrication. Finally the piston 73 passes and blocks off the inlet port 5 when it reaches its lowermost position during a discharging stroke of the apparatus. Therefore, additional lubricant cannot be forced from the barrel 17 into the cylinder until the handle is again lifted. Seals 79 and 81 prevent any leaking of lubricant around the piston while it is in this position. Normally the handle 103 will remain in its FIG. 1 position near the barrel 17 until an additional charge of lubricant is to be delivered to a point of lubrication.

When barrel 17 becomes emptied of lubricant, either no lubricant or less than a full charge of lubricant will be delivered to cylinder 1 when the handle is lifted to its FIG. 3 position. This is because piston 33 is stopped by check valve 39 so that no longer is the lubricant in barrel 17 under pressure nor in communication with cylinder 1. The operator will immediately know that the cylinder 1 is empty or has not been completely filled since piston 73 will not be raised to the FIG. 3 position and the nipple and the groove 99 will not register when he has raised the handle 103 to its upper stopped position.

When an empty lubricant cartridge is replaced with a filled cartridge, some air may become entrapped in the pump around check valve 7. This air may be bled to the atmosphere by opening plug 117 to place branch passages 113, 115 in communication. This prevents delivery of air to the point of lubrication and thus assures delivery of a full charge of lubricant with each stroke of the pump. It will be understood that in those cases in which the cartridge is not employed, the operation is like that above given. In such case the left end of the barrel 17 seats directly upon the sealing washer 21 and the use of the O-ring 22 and threaded member 24 may be dispensed with. The sealing lip 4 (FIG. 1) of the follower piston 33 is flexible enough to seal either within the barrel 17 when the cartridge 20 is not employed, or within the cartridge when it is employed.

The pump is especially useful where a measured charge of lubricant must be delivered to a point of lubrication. By way of example, the pump may be used for lubricating ball joints or other bearings of automobiles where the lubricating system is designed for lubrication at long mileage intervals, such as, for example, at 36,000-mile intervals. The ball joint seals in such automobiles are designed to retain lubricant and exclude contaminants from the atmosphere but they are not made to withstand internal pressures much in excess of atmospheric pressure. Therefore it is imperative that a specific measured quantity of lubricant (such as 10 grams) be provided to the joint in order to avoid excessively high internal pressures which would damage or blow out the seals. By using a pump of the invention having the proper size of cylinder 1, the exact quantity of lubricant desired can be injected into the joint. The pump can be used for injecting the original or a replacement charge of lubricant into the bearing. It also can be used in other environments where injection of a specific measured quantity of lubricant or other fluids is required.

It will be understood that the follower piston 33, instead of being loaded on the right by trapped air pressure as above described, may be spring-loaded, as will be apparent to those skilled in the art.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A measuring pump comprising a cylinder having a fluid inlet and a fluid outlet, an inwardly opening check valve in said inlet, an outwardly opening check valve in the outlet, a plunger, means for reciprocating the plunger throughout a full stroke thereof, limit means for said reciprocating means determining said stroke, a reciprocating piston in the cylinder, lost-motion driving means connecting the plunger and the piston to drive the piston to a position at one end of its stroke to eject fluid through the outlet and in which position a portion of the piston covers said inlet to block entry of fluid into the cylinder through the inlet, said plunger upon lost-motion retractive movement relative to the piston moving the piston sufficiently in the retractive direction that said portion of the piston uncovers the inlet, whereby fluid under pressure if present at the inlet drives the piston to a position in which at least some lost-motion retractive movement of the piston occurs relative to a fully retracted position of the plunger to indicate whether or not the cylinder is completely full of fluid.

2. A measuring pump made according to claim 1 including a barrel for lubricant attached to the cylinder and for supplying lubricant to said inlet check valve, a follower piston in said barrel on one side of which is carried said lubricant, and means for applying pressure to the other side of said follower piston.

3. A measuring pump made according to claim 2 further including means operated by said follower piston for blocking flow of fluid to the inlet check valve when the barrel has been substantially emptied of fluid by the piston.

4. A measuring pump made according to claim 2 further comprising a bleeder passage from the inlet side of the inlet check valve for discharging gas to the atmosphere, and means for closing said bleeder passage.

5. A measuring pump comprising a cylinder having a fluid inlet and a fluid outlet, an inwardly opening check valve in said inlet, an outwardly opening check valve in the outlet, a plunger having a head, means for reciprocating the plunger throughout a full stroke thereof, limit means for said reciprocating means determining said stroke, a hollow reciprocating piston in the cylinder into which the head end of the plunger extends, spaced stops for said head in the hollow piston limiting motion of the plunger relative to the piston to provide lost-motion driving means connecting the plunger and the piston to drive the piston to a position at one end of its stroke to eject fluid through the outlet and in which position an end portion of the piston covers said inlet to block entry of fluid into the cylinder through the inlet, said plunger upon lost-motion retractive movement relative to the piston moving the piston sufficiently in the retractive direction that said portion of the piston uncovers the inlet, whereby fluid under pressure if present at the inlet drives the piston to a position in which at least some lost-motion retractive movement of the piston occurs relative to a fully retracted position of the plunger to indicate whether or not the cylinder is completely full of fluid.

6. A measuring pump made according to claim 5 wherein the part of the plunger outside of the piston is indexed to register with a visible part of the piston to facilitate said indication.

7. A measuring pump made according to claim 6 including sealing means in the cylinder for receiving said end portion of the piston when it is in position covering said inlet.

8. A measuring pump made according to claim 7 wherein said means for reciprocating the plunger comprises a link having a pivotal connection with the cylinder and an oscillating handle for pivotal connection with said link and with said plunger.

9. A measuring pump made according to claim 8 including a barrel for lubricant attached to the cylinder and for supplying lubricant to said inlet check valve, a follower piston in said barrel on one side of which is carried said lubricant, and means for applying pressure to the other side of said follower piston.

10. A measuring pump made according to claim 8 including a flexible outlet fluid line extending from said outlet check valve and a swivelling nozzle connected at the end of said outlet line.

11. A measuring pump comprising an elongate pumping cylinder having a lateral inlet port intermediate its ends and an outlet port at one of its ends, check valves at the inlet and outlet ports to prevent discharge of lubricant from the cylinder through the inlet port and entrance of lubricant into the cylinder through the outlet port, a piston movable in the cylinder between a fully advanced position near the one end of the cylinder where it blocks the inlet port and a fully retracted position at the other end of the cylinder where the inlet port is unblocked, the piston having a bore which is closed at the cylinder end of the piston and open at the opposite end of the piston, means near the open end of the bore projecting radially inward into the bore to form a shoulder, a plunger movable toward and away from the cylinder, the plunger having an enlarged head positioned in the piston bore between the shoulder and the closed end of the piston bore, the head having a sliding lost-motion connection with the piston bore during movement of the plunger toward and away from the cylinder, means connected to the plunger for moving it toward and away from the cylinder whereby movement of the plunger moving means in one direction moves the plunger to a position where its head contacts the closed end of the piston to force the piston through the cylinder and discharge lubricant from the cylinder through the outlet port, the piston at the end of the discharge stroke being in its extended position and blocking the inlet port, and the plunger moving means when moved in the opposite direction retracting the plunger through the piston bore until the piston engages the shoulder near the open end of the piston bore to partially retract the piston from the cylinder to a point where the inlet port is opened so that the cylinder will be charged with lubricant under pressure through the inlet port, such charging of the cylinder moving said piston relative to the plunger to its fully retracted position.

References Cited

UNITED STATES PATENTS

| | | | |
|---|---|---|---|
| 1,902,822 | 3/1933 | Becker | 222—56 |
| 2,006,532 | 7/1935 | Bagley | 222—66 |

ROBERT B. REEVES, *Primary Examiner.*

HADD S. LANE, *Assistant Examiner.*